(12) United States Patent
D'Annunzio

(10) Patent No.: US 12,513,385 B2
(45) Date of Patent: Dec. 30, 2025

(54) SYSTEMS AND METHODS FOR VEHICLE INFORMATION CAPTURE USING WHITE LIGHT

(71) Applicant: Leonardo US Cyber and Security Solutions, LLC, Greensboro, NC (US)

(72) Inventor: Dennis Bernardo D'Annunzio, Greensboro, NC (US)

(73) Assignee: Leonardo US Cyber and Security Solutions, LLC, Greensboro, NC (US)

( * ) Notice: Subject to any disclaimer, the term of this patent is extended or adjusted under 35 U.S.C. 154(b) by 262 days.

(21) Appl. No.: 17/690,138

(22) Filed: Mar. 9, 2022

(65) Prior Publication Data
US 2022/0294946 A1    Sep. 15, 2022

Related U.S. Application Data

(60) Provisional application No. 63/158,949, filed on Mar. 10, 2021.

(51) Int. Cl.
*H04N 23/56* (2023.01)
*G06T 1/60* (2006.01)
(Continued)

(52) U.S. Cl.
CPC ............... *H04N 23/56* (2023.01); *G06T 1/60* (2013.01); *G06T 7/20* (2013.01); *G06T 7/70* (2017.01);
(Continued)

(58) Field of Classification Search
CPC .................. H04N 23/56; G06V 20/625; G06T 2207/10024
See application file for complete search history.

(56) References Cited

U.S. PATENT DOCUMENTS

| 3,656,111 A | 4/1972 | Royster, Sr. |
| 4,843,463 A | 6/1989 | Michetti |
| (Continued) | | |

FOREIGN PATENT DOCUMENTS

| CA | 2620630 C | 9/2014 |
| CA | 2916418 A1 | 6/2017 |
| (Continued) | | |

OTHER PUBLICATIONS

International Search Report and the Written Opinion of the International Searching Authority for PCT/US22/19459, mailed Jul. 12, 2022.

(Continued)

*Primary Examiner* — Jayanti K Patel
*Assistant Examiner* — Christopher Kingsbury Glover
(74) *Attorney, Agent, or Firm* — Adams & Reese LLP

(57) ABSTRACT

Embodiments of systems and methods for vehicle information capture using white light are disclosed. In embodiments, the method may include capturing two or more near-infrared (NIR) or infrared (IR) images of a license plate of a vehicle. The method may include, in response to a determination that the license plate was captured, determining if images containing contiguous images of the license plate were captured. The method may include, in response to a determination that images containing contiguous images of the license plate were captured, determining a target illumination zone and a time that the vehicle will pass through the target illumination zone. The method may include, in response to a determination that the vehicle is in a target illumination zone, initiating a pulse of a white light and capturing a white light image. The method may include determining a license plate number based on the white light image.

20 Claims, 8 Drawing Sheets

(51) Int. Cl.
*G06T 7/20* (2017.01)
*G06T 7/70* (2017.01)
*G06V 20/62* (2022.01)
*H04N 23/51* (2023.01)

(52) U.S. Cl.
CPC ........... *G06V 20/625* (2022.01); *H04N 23/51* (2023.01); *G06T 2207/10024* (2013.01); *G06T 2207/10048* (2013.01); *G06T 2207/30241* (2013.01); *G06T 2207/30256* (2013.01)

(56) References Cited

U.S. PATENT DOCUMENTS

| | | | |
|---|---|---|---|
| 6,140,941 A | 10/2000 | Dwyer et al. | |
| 6,340,935 B1 | 1/2002 | Hall | |
| 6,538,580 B2 | 3/2003 | Bostrom | |
| 6,650,765 B1 | 11/2003 | Alves | |
| 6,754,368 B1 | 6/2004 | Cohen | |
| 6,844,841 B1 | 1/2005 | Masciulli | |
| 6,922,138 B2 | 7/2005 | Melvin | |
| 6,959,869 B2 | 11/2005 | Tsikos et al. | |
| 6,982,654 B2 | 1/2006 | Rau et al. | |
| 7,046,169 B2 | 5/2006 | Bucholz et al. | |
| 7,173,526 B1 | 2/2007 | Monroe | |
| 7,227,974 B2 | 6/2007 | Kamijo et al. | |
| 7,342,511 B2 | 3/2008 | Schuette | |
| 7,344,284 B2 | 3/2008 | Lynam et al. | |
| 7,382,280 B2 | 6/2008 | Long | |
| 7,460,028 B2 | 12/2008 | Garibotto et al. | |
| 7,465,108 B2 | 12/2008 | Brown | |
| 7,482,910 B2 | 1/2009 | Melvin | |
| 7,504,965 B1 | 3/2009 | Windover et al. | |
| 7,535,793 B2 | 5/2009 | Frantz | |
| 7,825,829 B2 | 11/2010 | Madsen | |
| 7,868,912 B2 | 1/2011 | Venetianer | |
| 7,889,931 B2 | 2/2011 | Webb et al. | |
| 7,920,626 B2 | 4/2011 | Fernandez | |
| 8,068,154 B2 | 11/2011 | Jacob et al. | |
| 8,117,090 B2 | 2/2012 | Romero | |
| 8,243,140 B1 | 8/2012 | Howe | |
| 8,408,772 B2 * | 4/2013 | Li | G02B 19/0028 362/555 |
| 8,447,112 B2 | 5/2013 | Paul et al. | |
| 8,666,801 B2 | 3/2014 | Cho | |
| 8,693,733 B1 | 4/2014 | Harrison | |
| 8,704,889 B2 | 4/2014 | Hofman | |
| 8,774,465 B2 | 7/2014 | Christopulos et al. | |
| 8,781,169 B2 | 7/2014 | Jackson et al. | |
| 8,817,098 B2 | 8/2014 | Millar | |
| 8,953,044 B2 | 2/2015 | Wu et al. | |
| 8,983,137 B2 | 3/2015 | Hradetzky | |
| 9,058,619 B2 | 6/2015 | Nandakumar et al. | |
| 9,141,503 B1 | 9/2015 | Chen | |
| 9,158,954 B2 | 10/2015 | Thuries et al. | |
| 9,171,382 B2 | 10/2015 | Nerayoff et al. | |
| 9,245,203 B2 | 1/2016 | Hofman et al. | |
| 9,280,895 B2 | 3/2016 | Wang et al. | |
| 9,327,685 B1 | 5/2016 | Wooten | |
| 9,342,934 B2 | 5/2016 | Chen | |
| 9,426,345 B1 | 8/2016 | Turner, Jr. et al. | |
| 9,436,880 B2 | 9/2016 | Bos et al. | |
| 9,471,838 B2 | 10/2016 | Miller et al. | |
| 9,477,917 B1 | 10/2016 | Koch | |
| 9,491,420 B2 | 11/2016 | Mimar | |
| 9,495,869 B2 | 11/2016 | Bhogal et al. | |
| 9,497,393 B2 | 11/2016 | Reed et al. | |
| 9,538,060 B1 | 1/2017 | Cilia | |
| 9,542,609 B2 | 1/2017 | Wu et al. | |
| 9,594,158 B2 | 3/2017 | Abl | |
| 9,607,510 B1 | 3/2017 | DeLorean | |
| 9,652,666 B2 | 5/2017 | Nerayoff et al. | |
| 9,685,084 B2 | 6/2017 | Scholl et al. | |
| 9,715,703 B2 | 7/2017 | Robinson et al. | |
| 9,779,309 B1 | 10/2017 | Fink et al. | |
| 9,796,331 B2 | 10/2017 | Karner et al. | |
| 9,818,157 B2 | 11/2017 | McCall et al. | |
| 9,846,883 B2 | 12/2017 | Angell et al. | |
| 9,858,493 B2 | 1/2018 | Tseng | |
| 9,911,297 B2 | 3/2018 | Lundy | |
| 9,972,230 B1 | 5/2018 | DeLorean | |
| 9,990,376 B2 | 6/2018 | Voeller et al. | |
| 9,996,861 B2 | 6/2018 | Ryan et al. | |
| 10,027,361 B2 | 7/2018 | Griffin | |
| 10,032,212 B2 | 7/2018 | Winkelman et al. | |
| 10,055,906 B1 | 8/2018 | Fournier et al. | |
| 10,057,713 B1 | 8/2018 | Rackley, III et al. | |
| 10,089,869 B1 | 10/2018 | Makled et al. | |
| 10,121,172 B2 | 11/2018 | Hudson | |
| 10,127,437 B2 | 11/2018 | Bhanu et al. | |
| 10,140,488 B1 | 11/2018 | Bondarenko et al. | |
| 10,152,858 B2 | 12/2018 | Boykin | |
| 10,164,974 B2 | 12/2018 | Spencer et al. | |
| 10,198,954 B2 | 2/2019 | Holtzman et al. | |
| 10,217,034 B2 | 2/2019 | Hoshino | |
| 10,223,609 B2 | 3/2019 | Bhanu et al. | |
| 10,373,226 B1 | 8/2019 | Russell | |
| 10,417,816 B2 | 9/2019 | Satzoda et al. | |
| 10,559,200 B1 | 2/2020 | Langley et al. | |
| 10,691,968 B2 | 6/2020 | Blais-Morin et al. | |
| 10,872,524 B2 | 12/2020 | Kienitz et al. | |
| 11,030,892 B1 | 6/2021 | Langley et al. | |
| 11,080,533 B2 | 8/2021 | Camilus et al. | |
| 11,243,959 B1 | 2/2022 | Gilboa | |
| 11,941,716 B2 | 3/2024 | Child et al. | |
| 2002/0089157 A1 | 7/2002 | Breed et al. | |
| 2002/0186148 A1 | 12/2002 | Trajkovic et al. | |
| 2003/0131011 A1 | 7/2003 | Haunschild et al. | |
| 2004/0218052 A1 | 11/2004 | DiDomenico et al. | |
| 2005/0012817 A1 | 1/2005 | Hampapur | |
| 2005/0065711 A1 | 3/2005 | Dahlgren et al. | |
| 2006/0007308 A1 | 1/2006 | Ide | |
| 2006/0028556 A1 | 2/2006 | Bunn et al. | |
| 2006/0030985 A1 | 2/2006 | Lawida et al. | |
| 2006/0106659 A1 | 5/2006 | Santos et al. | |
| 2006/0109083 A1 | 5/2006 | Rathus et al. | |
| 2006/0180647 A1 | 8/2006 | Hansen | |
| 2006/0269105 A1 | 11/2006 | Langlinais | |
| 2006/0278705 A1 | 12/2006 | Hedley et al. | |
| 2007/0008129 A1 | 1/2007 | Soliman | |
| 2007/0009136 A1 | 1/2007 | Pawlenko et al. | |
| 2007/0069921 A1 | 3/2007 | Sefton | |
| 2007/0112620 A1 | 5/2007 | Johnson | |
| 2007/0229307 A1 | 10/2007 | Pawlenko et al. | |
| 2007/0291118 A1 | 12/2007 | Shu et al. | |
| 2008/0045245 A1 | 2/2008 | Billmaier et al. | |
| 2008/0117296 A1 | 5/2008 | Egnal et al. | |
| 2008/0285803 A1 | 11/2008 | Madsen | |
| 2009/0088924 A1 | 4/2009 | Coffee et al. | |
| 2009/0161913 A1 | 6/2009 | Son | |
| 2010/0066537 A1 | 3/2010 | Weller et al. | |
| 2010/0088123 A1 | 4/2010 | McCall et al. | |
| 2010/0195871 A1 | 8/2010 | Simon | |
| 2010/0245582 A1 | 9/2010 | Harel | |
| 2010/0283662 A1 | 11/2010 | Fox | |
| 2011/0053559 A1 | 3/2011 | Klein | |
| 2011/0134240 A1 | 6/2011 | Anderson et al. | |
| 2011/0228085 A1 | 9/2011 | Hofman | |
| 2011/0228253 A1 | 9/2011 | Batten et al. | |
| 2011/0267222 A1 | 11/2011 | Craig | |
| 2011/0313644 A1 | 12/2011 | Grassi | |
| 2012/0106801 A1 | 5/2012 | Jackson | |
| 2012/0140079 A1 | 6/2012 | Millar | |
| 2012/0155712 A1 * | 6/2012 | Paul | G06V 20/625 382/105 |
| 2013/0082828 A1 | 4/2013 | Furey et al. | |
| 2013/0093886 A1 | 4/2013 | Rothschild | |
| 2013/0129152 A1 | 5/2013 | Rodriguez Serrano et al. | |
| 2013/0132166 A1 | 5/2013 | Wu et al. | |
| 2013/0135468 A1 | 5/2013 | Kim | |
| 2013/0282448 A1 | 10/2013 | Rydbeck et al. | |
| 2013/0303189 A1 | 11/2013 | Bennett | |
| 2013/0306728 A1 | 11/2013 | Thuries et al. | |
| 2013/0308003 A1 * | 11/2013 | Raghavan | G06V 20/62 348/222.1 |

(56) References Cited

U.S. PATENT DOCUMENTS

| | | |
|---|---|---|
| 2013/0325629 A1 | 12/2013 | Harrison |
| 2014/0046800 A1 | 2/2014 | Chen |
| 2014/0066089 A1 | 3/2014 | Monks |
| 2014/0093125 A1 | 4/2014 | Hradetzky |
| 2014/0126779 A1 | 5/2014 | Duda |
| 2014/0139660 A1 | 5/2014 | Zhu |
| 2014/0159925 A1 | 6/2014 | Mimeault et al. |
| 2014/0160283 A1 | 6/2014 | Hofman et al. |
| 2014/0225719 A1 | 8/2014 | Kesavan et al. |
| 2014/0241585 A1 | 8/2014 | Zafiroglu et al. |
| 2014/0254866 A1 | 9/2014 | Jankowski et al. |
| 2014/0254877 A1 | 9/2014 | Jankowski et al. |
| 2014/0254878 A1 | 9/2014 | Jankowski et al. |
| 2014/0334684 A1 | 11/2014 | Strimling |
| 2015/0049914 A1 | 2/2015 | Alves |
| 2015/0054676 A1 | 2/2015 | Vinski et al. |
| 2015/0113012 A1 | 4/2015 | Silver |
| 2015/0119069 A1 | 4/2015 | Harris et al. |
| 2015/0123794 A1 | 5/2015 | Hamalainen et al. |
| 2015/0138001 A1 | 5/2015 | Davies |
| 2015/0149465 A1 | 5/2015 | Unser et al. |
| 2015/0154669 A1 | 6/2015 | Wu et al. |
| 2015/0205868 A1 | 7/2015 | Boncyk et al. |
| 2015/0294373 A1 | 10/2015 | Schuh |
| 2015/0310293 A1 | 10/2015 | Dehart |
| 2015/0317687 A1 | 11/2015 | Ramesh et al. |
| 2015/0348342 A1 | 12/2015 | Baxley et al. |
| 2015/0356498 A1 | 12/2015 | Casanova |
| 2015/0381946 A1 | 12/2015 | Renkis |
| 2015/0381948 A1 | 12/2015 | Renkis |
| 2016/0021344 A1 | 1/2016 | Renkis |
| 2016/0098864 A1 | 4/2016 | Nawrocki |
| 2016/0110759 A1 | 4/2016 | Polehn et al. |
| 2016/0112461 A1 | 4/2016 | Othmer |
| 2016/0124071 A1 | 5/2016 | Baxley et al. |
| 2016/0266579 A1 | 9/2016 | Chen |
| 2016/0343252 A1 | 11/2016 | Davies et al. |
| 2016/0344979 A1 | 11/2016 | Renkis |
| 2017/0018170 A1 | 1/2017 | Sayavong et al. |
| 2017/0032666 A1 | 2/2017 | Pretorius et al. |
| 2017/0048376 A1 | 2/2017 | Logan |
| 2017/0061506 A1 | 3/2017 | Dow et al. |
| 2017/0124395 A1 | 5/2017 | Cohen et al. |
| 2017/0126648 A1 | 5/2017 | Bond et al. |
| 2017/0131202 A1 | 5/2017 | McClintock et al. |
| 2017/0140237 A1 | 5/2017 | Voeller et al. |
| 2017/0186317 A1 | 6/2017 | Franklin et al. |
| 2017/0193810 A1 | 7/2017 | Cao et al. |
| 2017/0206559 A1 | 7/2017 | Bakshi et al. |
| 2017/0308964 A1 | 10/2017 | Morris et al. |
| 2017/0330455 A1 | 11/2017 | Kikuchi et al. |
| 2017/0339529 A1 | 11/2017 | Buttolo et al. |
| 2017/0357662 A1 | 12/2017 | Knany et al. |
| 2017/0357881 A1* | 12/2017 | Hoshino ............... H04N 5/144 |
| 2017/0365105 A1 | 12/2017 | Rao et al. |
| 2017/0372143 A1 | 12/2017 | Barcus et al. |
| 2017/0374324 A1 | 12/2017 | Loftus |
| 2018/0032590 A1 | 2/2018 | Recavarren |
| 2018/0072177 A1 | 3/2018 | Tremblay |
| 2018/0096595 A1 | 4/2018 | Janzen et al. |
| 2018/0103348 A1 | 4/2018 | Malone |
| 2018/0107528 A1 | 4/2018 | Vizer et al. |
| 2018/0107892 A1* | 4/2018 | Istenes ................. G06V 20/63 |
| 2018/0137356 A1 | 5/2018 | Nerayoff et al. |
| 2018/0144382 A1 | 5/2018 | Makke et al. |
| 2018/0165935 A1 | 6/2018 | VanBlon et al. |
| 2018/0174457 A1 | 6/2018 | Taylor |
| 2018/0197416 A1 | 7/2018 | Hyde et al. |
| 2018/0211115 A1 | 7/2018 | Klein |
| 2018/0211116 A1 | 7/2018 | Modi et al. |
| 2018/0211117 A1 | 7/2018 | Ratti |
| 2018/0247519 A1 | 8/2018 | Bekanich |
| 2018/0253805 A1 | 9/2018 | Kelly et al. |
| 2018/0300578 A1 | 10/2018 | Wilbert et al. |
| 2018/0328757 A1 | 11/2018 | Chan et al. |
| 2018/0349699 A1 | 12/2018 | O'Connell et al. |
| 2018/0350230 A1 | 12/2018 | Kienitz et al. |
| 2018/0357247 A1 | 12/2018 | Siminoff et al. |
| 2019/0031146 A1 | 1/2019 | Etonye |
| 2019/0039463 A1 | 2/2019 | Moghe et al. |
| 2019/0043355 A1 | 2/2019 | Ferguson et al. |
| 2019/0050634 A1 | 2/2019 | Nerayoff et al. |
| 2019/0050652 A1 | 2/2019 | Baker et al. |
| 2019/0051142 A1 | 2/2019 | Wiles |
| 2019/0057601 A1 | 2/2019 | Watanabe et al. |
| 2019/0087864 A1 | 3/2019 | Hacker |
| 2019/0147260 A1* | 5/2019 | May ..................... B60W 50/14 382/103 |
| 2019/0147306 A1 | 5/2019 | Hoshino |
| 2019/0163982 A1 | 5/2019 | Block |
| 2019/0244498 A1 | 8/2019 | Dumas |
| 2019/0294890 A1 | 9/2019 | Kanga |
| 2019/0311327 A1 | 10/2019 | Habbaba et al. |
| 2019/0325230 A1 | 10/2019 | Nadler |
| 2019/0329421 A1 | 10/2019 | Deyle et al. |
| 2020/0097735 A1 | 3/2020 | Altuev |
| 2020/0104566 A1 | 4/2020 | Yamada et al. |
| 2020/0111350 A1 | 4/2020 | Julian et al. |
| 2020/0162701 A1 | 5/2020 | Nixon et al. |
| 2020/0211345 A1 | 7/2020 | Gordon-Carroll et al. |
| 2020/0265258 A1* | 8/2020 | Blais-Morin ........ G06V 20/582 |
| 2021/0026019 A1 | 1/2021 | Gahagan et al. |
| 2021/0044959 A1 | 2/2021 | Beaurepaire |
| 2021/0225161 A1 | 7/2021 | Horn |
| 2021/0326563 A1 | 10/2021 | Kossor |
| 2021/0398298 A1 | 12/2021 | Kisara |
| 2022/0141426 A1 | 5/2022 | Kim et al. |
| 2022/0148320 A1* | 5/2022 | Alakarhu ............... B64D 47/08 |
| 2022/0188953 A1 | 6/2022 | Child et al. |
| 2023/0010292 A1 | 1/2023 | Simon |
| 2023/0046309 A1 | 2/2023 | May |
| 2023/0070108 A1 | 3/2023 | Child |
| 2023/0073717 A1 | 3/2023 | Child |
| 2023/0073876 A1 | 3/2023 | Child |
| 2023/0162310 A1 | 5/2023 | Child et al. |
| 2023/0177954 A1 | 6/2023 | Neff et al. |
| 2023/0196780 A1 | 6/2023 | Nieuwkerk et al. |
| 2023/0237907 A1 | 7/2023 | Valcarcel et al. |
| 2023/0274647 A1 | 8/2023 | Nieuwkerk et al. |
| 2024/0021092 A1 | 1/2024 | Child |
| 2024/0185371 A1 | 6/2024 | Child et al. |

FOREIGN PATENT DOCUMENTS

| | | |
|---|---|---|
| CA | 3000127 A1 | 6/2018 |
| CA | 2924997 C | 6/2021 |
| CA | 2979406 C | 2/2024 |
| CN | 102708693 A | 10/2012 |
| CN | 203050715 U | 7/2013 |
| DE | 102005035242 A1 | 2/2007 |
| EP | 0784838 B1 | 6/2000 |
| EP | 1993279 A2 | 11/2008 |
| EP | 3726253 A1 | 10/2020 |
| EP | 3989194 A1 | 4/2022 |
| FR | 2975210 A3 | 11/2012 |
| GB | 2328731 A | 3/1999 |
| IN | 282920 B | 5/2017 |
| SG | 140858 A1 | 4/2008 |
| TW | 201935419 A | 9/2019 |
| WO | WO2004/027730 A1 | 4/2004 |
| WO | WO2007/032025 A2 | 3/2007 |
| WO | WO2008/088880 A1 | 7/2008 |
| WO | WO2011/023024 A1 | 3/2011 |
| WO | WO2012/038964 A2 | 3/2012 |
| WO | WO2014/152923 A1 | 9/2014 |
| WO | WO2015/193903 A2 | 12/2015 |
| WO | WO2017/180900 A1 | 10/2017 |
| WO | WO2018/009567 A1 | 1/2018 |
| WO | WO2019/043444 A1 | 3/2019 |
| WO | WO2019/043446 A1 | 3/2019 |
| WO | WO2019/099149 A1 | 5/2019 |

(56) References Cited

FOREIGN PATENT DOCUMENTS

WO     WO2019/162970 A1     8/2019
WO     WO2020/145882 A1     7/2020

OTHER PUBLICATIONS

Makarov, A., et al.; Authenticating Vehicles and Drivers in Motion Based on Computer Vision and RFID Tags; 2012 IEEE 10$^{th}$ Jubilee International Symposium on Intelligent Systems and Informatics; IEEE 2012; Year 2012.
Hoffman, Alwyn Jakobus and Albertus J. Pretorius: "SmartRoad; A new approach to law enforcement in dense traffic environments"; 2015 IEEE 18$^{th}$ International Conference on Intelligent Transportation Systems. IEEE, 2015; Year 2015.
Yaacoub, et al.; Security analysis of drones systems: Attacks, limitations, and recommendations; Internet of Things 11 (2020) 100218; Elsevier; www.elsevier.com/locate/iot; Retrieved on Apr. 17, 2023 (Apr. 17, 2023) from https://www.ncbi.nlm.nih.gov/pmc/articles/PMC7206421/.
Howington, Larry C.; Automated License Plate Reading; Development and use of Perceptics multi-purpose License Plate Reader Technology; Sep. 1989.
Waters, Rebecca; Automated License Plate Recognition: An Insider's Look; P&SN Police and Security News 2022; Posted by Publisher—Sep. 15, 2017.
Ceng, M. Smalley et al.; Videqual—A tool for quantitive meansurement of fixed CCTV Surveillance Systems; Presented and Published at the International Carnahan Conference on Security Technology 1996; 0-7803-3537-6-9/06; 1996 IEEE.
Kanayama, Kenji et al.; Development of Vehicle-License Number Recognition System Using Real-Time Image Processing and Its Application to Travel-Time Measurement; CH2944-7/91/0000/0798; 1991 IEEE.
Kwasnicka, Halina and Wawrzyniak, Bartosz; License Plate Localization and Recognition in Camera Pictures; AI-METH 2002—Artificial Intelligence Methods; Gliwice, Poland, Nov. 13-15, 2002.
Appian Technology PLC; Talon—Description and Technical Specification—Automatic Number Plate Recognition System; Copyright 2003.
Foresti, Gian Luca et al. "Visual Sensor Technology for Advanced Surveillance Systems: Historical View, Technological Aspects and Research Activities in Italy", Department of Mathematics and Computer Science University of Udine, via delle Scienze, 206, 33100 Udine, Italy, Sensors ISSN 1424-8220; 19 Pages (2252-2270); Year 2009.
Valera, M. and Velastin, S.A., "Intelligent distributed surveillance systems: a review", Source: vol. 152, Issue 2, Apr. 2005, p. 192-204, DOI: 10. 1049/ip-vis:20041147, Print ISSN 1350-245X, Online ISSN 1359-7108; 13 pages; 2005.
Hampapur, A.; "smart video surveillance: exploring the concept of multiscale spatiotemporal tracking", Published in: IEEE Signal Processing Magazine (vol. 22, Issue: 2, Mar. 2005), pp. 38-51; 2005.
Girgensohn, Andreas, "DOTS: Support for Effective Video Surveillance", MM '07: Proceedings of the 15$^{th}$ ACM International conference on Multimedia Sep. 2007; pp. 423-432; 2007.
Hu, Weiming, et al.; "A Survey on Visual Surveillance of Object Motion and Behaviors"; IEEE Transactions on Systems, Man, and Cybernetics, Part C: Applications and Reviews, vol. 34, No. 3, Aug. 2004; pp. 334-352; Year 2004.
Panganiban, Edward B. et al.; "RFID-Based Vehicle Monitoring System"; 2017 IEEE 9$^{th}$ International Conference on Humanoid, Nanotechnology, Information Technology, Communication and Control, Environmental Management (HNICEM); IEEE, Dec. 1-3, 2017; pp. 1-6; Year 2017.

\* cited by examiner

SYSTEMS AND METHODS FOR VEHICLE INFORMATION CAPTURE USING WHITE LIGHT

CROSS-REFERENCE TO RELATED APPLICATION

The present application claims benefit of U.S. Provisional Patent Application No. 63/158,949, filed Mar. 10, 2021.

INCORPORATED BY REFERENCE

The disclosure of U.S. Provisional Patent Application No. 63/158,949, filed Mar. 10, 2021, is incorporated by reference herein for all purposed as if set in its entirety.

TECHNICAL FIELD

In one aspect, the present disclosure is directed to systems and methods for capture of a vehicle license plate, and more specifically, to systems and methods for capture and reading of license plate information such as a plate number, among other vehicle information or data. Other aspects also are described.

BACKGROUND

Automated License Plate Reading ("ALPR") systems or license plate reading ("LPR") systems are used for identifying vehicles such as for detecting stolen vehicles, traffic violations, and for collecting tolls, among other various reasons.

Many ALPR or LPR systems utilize a flood light approach to illuminate and capture license plate numbers over one or more lanes, e.g., for full lane coverage. To prevent distraction or unsafe conditions for drivers, ALPR systems generally utilize near infrared (NIR) or infrared (IR) light to read a license plate, e.g., a broad flood of NIR or IR light is generated and reflected images of license plates illuminated thereby are captured by a camera. NIR is barely visible to the eye, while IR is not visible to the eye, which thus helps avoid distraction of drivers, while continuously or frequently capturing NIR or IR imaged plates. However, the use of NIR or IR is dependent upon reflective license plates. Further, even if such ALPR systems are able to read the license plate number, the captured images using IR or NIR are generally monochromatic, making it difficult for current ALPR systems to distinguish other characteristics of the plate and/or vehicle, such as a state or country of origin of a plate, make and model of a vehicle, or color of a vehicle. Finally, if a license plate is not reflective or if a license place is altered in some way to reduce reflectivity, the license plate may not be read by more conventional ALPR systems.

Accordingly, the present disclosure is directed to embodiments of systems and methods for detecting, capturing and reading license plate and/or vehicle information that address the foregoing and other related, and unrelated, problems in the relevant art.

SUMMARY

Briefly described, the present disclosure includes systems and methods for capture and reading a license plate and/or gathering other information from a vehicle utilizing NIR or IR generated images and targeted white light. A series of NIR or IR images can be captured or collected, and will be utilized to determine a target illumination zone or a location where a target, such as a license plate or other identifying portions or attributes (by way of example and not limitation, bumper stickers, signage or lettering, accessories, decals or other images or customized features, etc.) of a vehicle or is estimated to be at a particular time. For example, two or more NIR or IR generated images can be captured by a camera, an input or otherwise provided to a processor/computing device that will execute programming instructions to determine a projected trajectory of the vehicle and a projected rate/speed of the vehicle, or other factors to enable a determination of a target illumination zone through which the vehicle is projected to travel, and/or during which the target plate/vehicle is or is estimated to be at a determined time. A targeted pulse or beam of white light will be generated and directed toward the target illumination zone, to develop a white light image.

The white light image will be captured by targeting white light at that specific location for a brief period of time by a white light illuminator. Since the NIR or IR images are used to determine the target illumination zone and since the white light image may be captured in a brief amount of time with a single pulse of white light, drivers in corresponding vehicles may not be distracted or even notice the white light pulse. Using the white light image, the LPR system may read the license plate number, determine the state or country of origin of the license plate, and/or determine the make, model, and/or color of the vehicle.

Accordingly, an embodiment of the disclosure is directed to a method for capturing vehicle information utilizing white light illumination. In embodiments, the method may include a computer implemented method for capturing vehicle information wherein at least one computing device performs a series of functions comprising capturing two or more near-infrared (NIR) or infrared (IR) images of a license plate of a vehicle. The image may be captured by an image capture device, a camera, or image sensors. The method may include determining, by the computing device, whether the license plate was captured. The method may include, in response to a determination that the vehicle's license plate was captured, determining, by the computing device, if two or more images containing contiguous images of the vehicle's license plate were captured.

In embodiments, the method may include providing the two or more captured NIR or IR images to a computing device. The method also may include determining, by the computing device, a projected trajectory of travel of the vehicle, and, in some embodiments, based on, or in view of such a projected trajectory, determine a target illumination zone through which the vehicle is projected to travel. The method may further include capturing, a white light image of at least a portion of the vehicle illuminated by the white light pulse, e.g. the white light pulse can illuminate the plate or vehicle in a similar manner to a flash for taking a photograph, or can strike and/or cause an image of the vehicle and/or license plate to be able to be captured by with an image capture device. The white light pulse can be generated with an array of one or more RGB or white light emitting diodes (LEDs), and directed through a lens configured to focus white light produced by the array of RGB or white LEDs at the vehicle so as to strike the vehicle at a location to avoid distraction of a driver of the vehicle The method may finally include determining, by the computing device, a license plate number and at least one additional feature of the vehicle based on the white light image.

In addition, the method may further include, prior to initiation of the pulse of the white light, determining whether the vehicle is in the target illumination zone. The pulse of white light may be initiated based on the determination that the vehicle is in the target illumination zone. In addition, in some aspects, the image capture device may include near-infrared image sensors and red, green, blue (RGB) image sensors. The image capture device may include RGB-NIR image sensors.

In other aspects, the target illumination zone may be defined by a portion of a lane of a one or more lane road. One or more target illumination zones may be defined for different portions of different lanes. The portion of the lane of the one or more lane road may be determined, by the computing device, based on the two or more NIR or IR images. The determination of the portion or the lane of the one or more lane road may further be based on a location of the vehicle at a first time and a location of the vehicle at a second time. In such aspects, the computing device may determine the trajectory of the vehicle based on the slope and intercept of the path of the vehicle. The slope and intercept may be based on the location of the vehicle at the first time and the location of the vehicle at the second time.

In other aspects, the pulse of white light may be produced by a light emitting diode (LED) array disposed behind a lens. The LED array can include red green blue (RGB) LEDs, or white light LEDs. The pulse of white light may be generated by one or more LEDs of the LED array. The one or more LEDs to use during the pulse may be determined based on the target illumination zone or the location of the target illumination zone. Each of the one or more LEDs may correspond to a target illumination zone. Each target illumination zone for each LED or combination of LED may be determined prior to capturing NIR or IR images. Such a pulse of the white light may be of a sufficient time interval and of a sufficient intensity to allow the image capture device to capture the white light image. Further, such a time interval or time frame, and the intensity thereof may be values such that a driver of the vehicle will not see or notice the pulse.

In other aspects, the at least one additional feature of the vehicle may include a state or country of origin for the license plate. The at least one additional feature of the vehicle may also include a vehicle's make, model, or color.

In other aspects, NIR or IR images, white light images, coordinates of a vehicle, velocity of a vehicle, target illumination zones, predictions (e.g., the vehicles trajectory, line of apparent travel, destination path, and/or time until arrival at the target illumination zone), and/or other data relevant to the vehicle may be stored in memory of the computing device. Such data may be stored in tables in the memory, such as tag tables and/or prediction tables. Upon predictions being determined or at some point after a white light image capture, the data in each table may be deleted or removed.

Another embodiment of the disclosure is directed to a vehicle license plate reading (LPR) system. The system may include a NIR or IR emitter. The NIR or IR emitter may include an array of NIR or IR LEDs. The system may include an array of RGB or white LEDs and a lens disposed in front of the array of RGB or white LEDs. The lens may be configured to focus the white light produced by one or more LEDs of the array of RGB or white LEDs. The system may include a camera configured to capture NIR or IR images reflected by NIR or IR light and white light images reflected by the white light. The NIR or IR images and white light images may include images of at least a vehicle's license plate.

The system may include a computing device. The computing device may include memory for storing captured NIR or IR images, white light images, and vehicle information capture instructions. The system may include one or more processors. The one or more processors may be configured to execute the vehicle information capture instructions from memory. The executed vehicle information capture instructions may initiate continuous or periodic pulses from the NIR or IR emitter. The one or more processors may be configured, when executing the instructions, to receive captured NIR or IR images from the camera.

In some embodiments, the executed vehicle information capture instructions may determine if two or more contiguous NIR or IR images of the license plate are captured. The executed vehicle information capture instructions may, in response to a determination that two or more contiguous NIR or IR images of the license plate are captured, determine a target illumination zone and a time that the license plate will be in the target illumination zone. The executed vehicle information capture instructions may, in response to a determination that the time that the license plate will be in the target illumination zone has been met, activate one or more LEDs of the array of RGB or white LEDs to produce a targeted pulse of white light directed toward the target illumination zone. The executed vehicle information capture instructions may capture white light images illuminated by the targeted pulse of white light. The executed vehicle information capture instructions may determine a license plate number and at least one additional identifying feature of the license plate and/or the vehicle. In other aspects, the additional identifying feature of the license plate and/or the vehicle may include one or more of a state or country of origin of the license plate, a vehicle's make, model, color, and/or other identifying portions or attributes, including, for way of example and not limitation, bumper stickers, signage or lettering, accessories, decals or other images or customized features, etc. . . .

In other aspects the NIR or IR emitter and the array of RGB or white LEDs may be disposed side-by-side in the system. In yet another aspect the NIR or IR emitter may be positioned above or attached to the top of the array of RGB or white LEDs. In yet another aspect the array of RGB or white LEDs may be positioned above or attached to the top of the NIR or IR emitter.

In another aspect, the NIR or IR emitter and array of RGB or white LEDs may be fixedly mounted within the system. In yet another aspect, the NIR or IR emitter and/or the array of RGB or white LEDs may be moveably mounted within the system.

In another aspect, the computing device may determine where the array of RGB or white LEDs is to be pointed based on captured NIR or IR images of the license plate. The computing device may also determine where the NIR or IR emitter is to be pointed based on previously captured NIR or IR images of license plates.

In another aspect, captured NIR or IR images may be removed from memory after determining the target illumination zone and the time. The captured white light images may also be removed from memory after determining a license plate number and state or country of origin of the license plate.

Another embodiment of the disclosure is directed to a white light illumination based license plate reading (LPR) apparatus. The apparatus may include an array of NIR or IR LEDs. The apparatus may include an array of RGB or white LEDs. The apparatus may include a lens disposed in front of the RGB or white LEDs. The lens may focus the white light produced by one or more LEDs of the array of RGB or white LEDs at a target or target illumination zone. The apparatus may include a camera. The camera may include image sensors capable of capturing NIR or IR images and white light images of a license plate and other portions of a vehicle. The NIR or IR images may be captured during illumination by the array of NIR or IR LEDs during a continuous or substantially continuous interval of time or time frame. The white light images may be captured during illumination by the one or more LEDs of the array of RGB or white LEDs during a pulse. The pulse may be determined based on contiguous captured NIR or IR images. The contiguous captured NIR or IR images may include a time and location of the NIR or IR images. Such time and location may be utilized to determine the trajectory of vehicle, a target illumination zone based on the trajectory, and a time that the vehicle will be in the target illumination zone.

The apparatus may include memory to store captured NIR or IR images, white light images, license plate numbers, license plate state or country of origin, vehicle make, vehicle model, and/or vehicle color. In another aspect captured white light images are removed from memory after determining a license plate number and license plate state or country of origin.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the scope of the disclosure. Embodiments incorporating teachings of the present disclosure are shown and described with respect to the drawings herein, in which:

The use of the same reference symbols in different drawings indicates similar or identical items.

DETAILED DESCRIPTION

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings. So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

Figure 1:
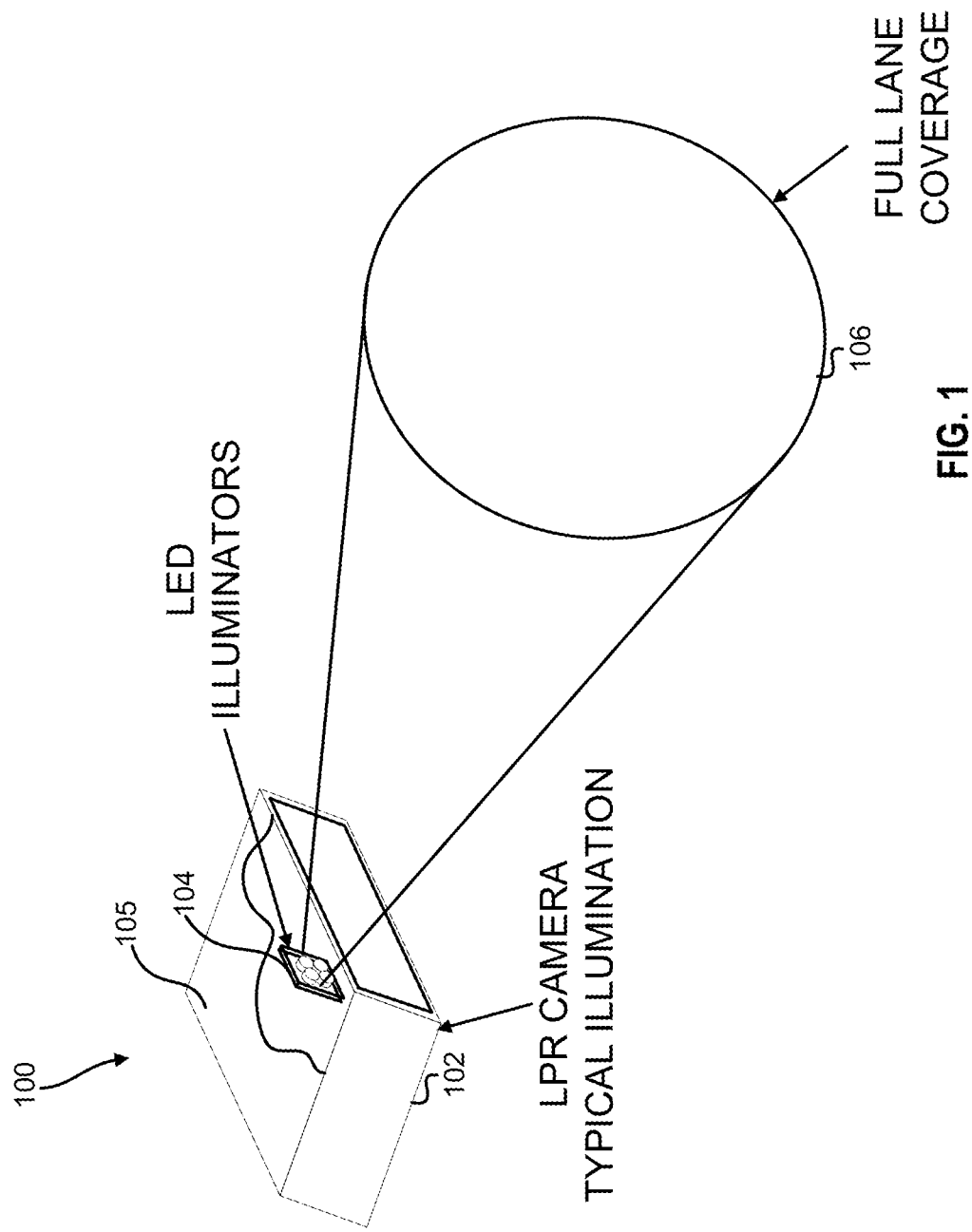
FIG. 1 is a schematic diagram of an illuminator for a license plate reading (LPR) system, according to the present disclosure.

FIG. 1 is a schematic diagram of an illuminator of for use in an LPR system, according to the present disclosure. Such a LPR system 100 may include a near infrared (NIR) or infrared (IR) illuminator 103. The NIR or IR illuminator 103 may be included in a LPR system's housing 102. The housing 102 may be separate from or integrated into a camera or image capture device housing of the LPR system 100. The housing 102 may include other components, such as a computing device or controller, image sensors, and/or other illuminators, as described herein. As the camera or image sensors capture an image, e.g., a NIR or IR image, a NIR or IR LED array 104 or NIR or IR emitter of the illuminator 103, shown disposed within housing 102, may illuminate a target. The camera or image sensors may be configured to capture the NIR or IR images visible by the NIR or IR light striking and/or illuminating the target vehicle. FIG. 1 further illustrates a top portion 105 of the housing 102 with a cut-away to show the NIR or IR LED array 104 disposed within the housing 102. In such embodiments, the NIR or IR LED array 104 may include retention features corresponding to retention features within the housing 102.

The LPR system 100 may provide full lane coverage 106 of any particular roadway, e.g., two-lane road, three-lane road, four-lane road, etc. and/or a road with unidirectional lanes or bidirectional side-by-side lanes. Bidirectional side-by-side lanes may refer to, for example, two sets of lanes, where one set of lanes includes traffic moving in one direction, while the other set of lanes includes traffic moving in an opposite direction. Such LPR systems 100 may continuously or periodically, e.g., every 16 milliseconds, every 32 milliseconds, every 64 milliseconds, etc., illuminate a target for image capture. A target may refer to a vehicle. In particular, a target may refer to a vehicle's license plate or other portion of the vehicle indicating information, e.g., make and/or model. A vehicle may refer to a motorist vehicle, such as a car, truck, eighteen wheelers, other heavy vehicles, motorcycles, and/or any other vehicle including a license plate. Due to the use of NIR or IR light, which is barely visible or not visible at all to the human eye, such frequent image captures may not distract a driver or cause unsafe driving conditions. However, such a LPR system 100 cannot distinguish between color and merely captures a license plate number. Further, if a surface of a license plate is covered with a material or altered to eliminate or reduce reflectivity or if a custom or non-United States based license plate is used, then the LPR system 100 may not capture the license plate number or any other information.

Figure 2:
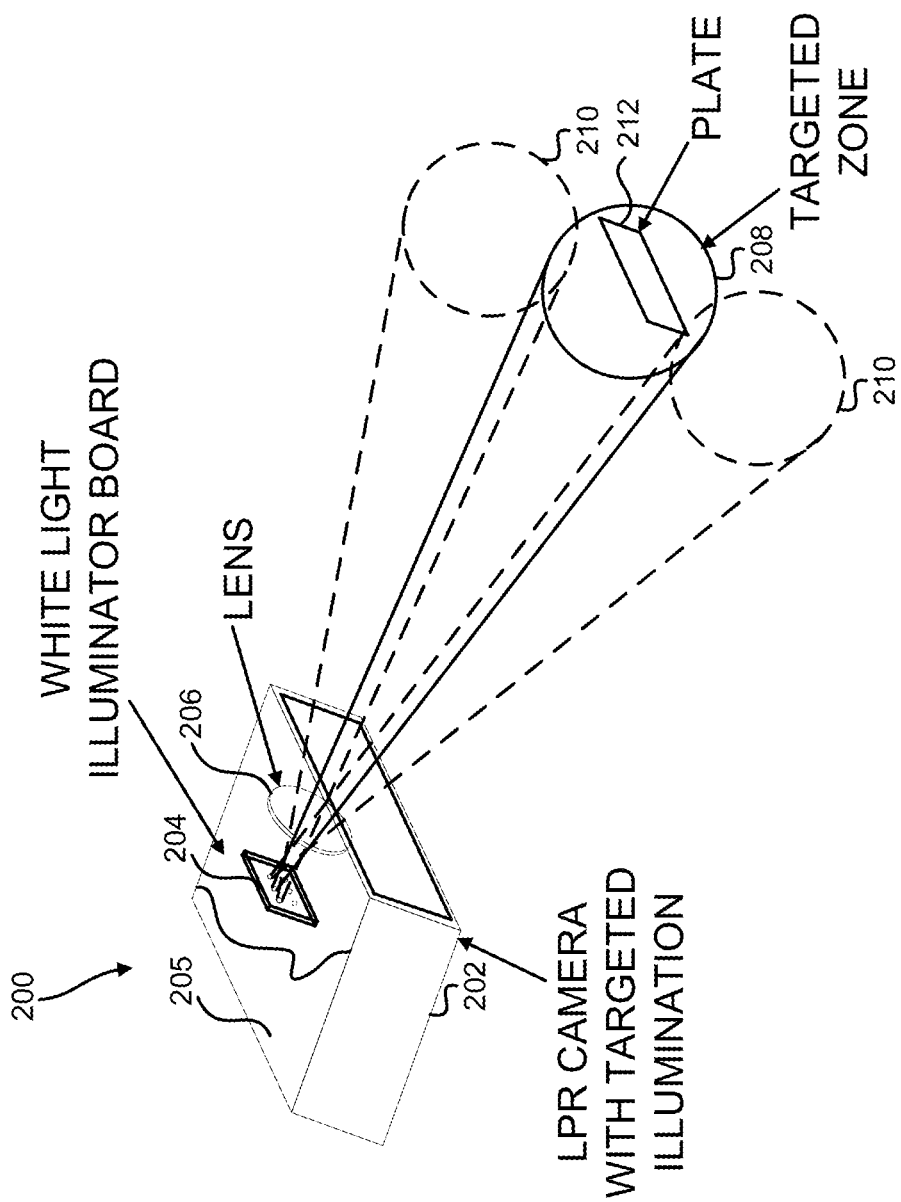
FIG. 2 is a schematic diagram of a white light illuminator for a license plate reading (LPR) system, according to the present disclosure.

The use of a NIR or IR LED array 104 in conjunction with a white light illuminator 200, such as a white light LED array 204, provides the LPR system 100 or LPR camera with higher accuracy in image captures, and the further potential to capture additional information in an image, while ensuring that drivers remain safe and unaffected from frequent white light strobes or pulses. The white light LED Array 204, as illustrated in FIG. 2, may also be included in a housing 202. The LPR system 100 may include a camera or image sensors. The LPR system 100 may also include the NIR or IR LED array 104 or NIR or IR emitter. The LPR camera or LPR system may include the NIR or IR LED array 104 board and the white light LED array 204 board in various configurations or in separate housings. The white light LED array 204 may be attached to or connected to the LPR camera or LPR system's housing 202 or may be integrated into the LPR camera or LPR system's housing 202. In another embodiment, the white light LED array 204 may be an optional and/or add-on accessory included in a separate housing, to enable the use of white light image capture in conjunction with an LPR system 100 according to the principles of the present disclosure. Further, such a separate housing may include attachment or tool-less attachment features to allow for quick and simple attachment of the white light LED array 204 to corresponding retention or attachment features of an image capture device, LPR camera, or LPR system.

The housing 202 of the LPR system 100 may include a white light LED array 204. The white light LED array 204 may be composed of white light LEDs or a combination of red, green, blue (RGB) LEDs. The white light LED array 204 may be assembled and powered to offer just enough, e.g., of a sufficient intensity for a sufficient time, targeted white light for an image sensor or camera to capture a color picture or image of a license plate 212 at a certain distance. FIG. 2 further illustrates a top portion 205 of the housing 202 with a cut-away to show the white light LED array 204 disposed within the housing 202. In such embodiments, the white light LED array 204 may include retention features corresponding to retention features within the housing 202.

The LPR system 100 may include an on-board power source or may connect to a power source. In such examples, the housing 202 may include power connectors. On-board power sources may include batteries, capacitors, or other power storage devices. A cable, pins, or a socket may be disposed on the outside of the housing 202 to connect to a power source.

The white light LED array 204 of the white light illuminator 200 may include a circuit board(s) with pins or a socket including tracing or traces to each LED of the white light LED array 204. The pins or socket may correspond to a socket or pins, respectively, located on the LPR system, LPR camera, image capture device, and/or housing 202. The pins or sockets may connect to and allow for transfer of power to the white light LED array 204, in addition to other data signals, e.g., signals to indicate when to illuminate or activate which LEDs of the white light LED array 204. In another embodiment, the white light LED array 204 may include a controller or control board including one or more processors. As signals are received from a camera, image capture device, and/or computing device, the controller or control board may send a signal to a specified LED or LEDs. The signal may cause the specified LED or LEDs to illuminate or activate for a specified period of time.

The LPR system 100 may include a lens 206. The lens 206 may be disposed or positioned in front of the white light LED array 204. As one or more of the LEDs of the white light LED array 204 are illuminated or activated, the lens 206 may focus the light from the illuminated LEDs to a target. In such examples, the lens 206 may be a convex or Fresnel lens, although other types of lenses also can be used. The lens 206 may be comprised of glass, plastic, or any other suitable material. The lens 206 may be positioned or disposed before an aperture or opening of the housing 202. In another embodiment, the lens 206 may be disposed in the aperture or opening. In yet another embodiment, the lens 206 may be positioned over the outside housing 202 in front of the aperture or opening of the housing 202. In any embodiment, the housing 202 may include features to retain the lens 206.

As noted, as one or more of the LEDs of the white light LED array 204 are illuminated or activated, the lens 206 may focus the light from the illuminated LEDs to a target, target illumination zone, or white light target zone. A computing device, camera, image capture device, controller, or other suitable device may also determine a number of target illumination zones (see 208 and 210). Each target illumination zone may correspond to an LED or combination of LEDs. Such a determination may be based on a focal point of the lens 206. The computing device, camera, image capture device, controller, or other suitable device may determine a targeted zone 208 or white light target zone based on NIR or IR images of a license plate 212 captured over a period of time by the camera or image sensors while illuminating the license plate with the NIR or IR illuminator 103. Factors included in determining a targeted zone 208 may also include the speed a vehicle is traveling, a particular lane that the vehicle is traveling in, the position of the vehicle at a first time and second time, other factors, and/or some combination thereof. Depending on such factors, particular LEDs of the white light LED array 204 may be illuminated at determined periods of time to target specific zones or areas, e.g., targeted zone 208, zones 210, and/or other zones.

Figure 3A:
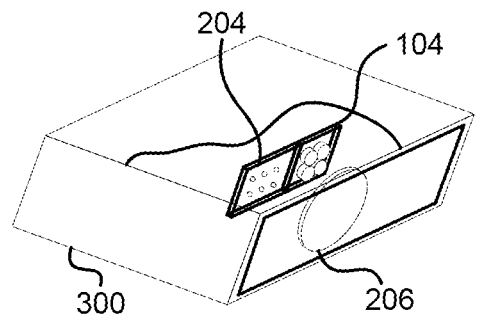
FIG. 3A, FIG. 3B, and FIG. 3C are schematic diagrams of various configurations of white light illuminators and near infrared or infrared illuminators for a license plate reading (LPR) system, according to the present disclosure.
Figure 3B:
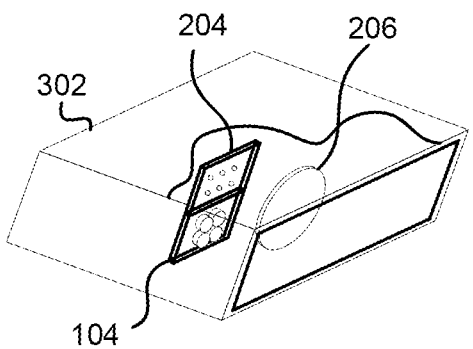
Figure 3C:
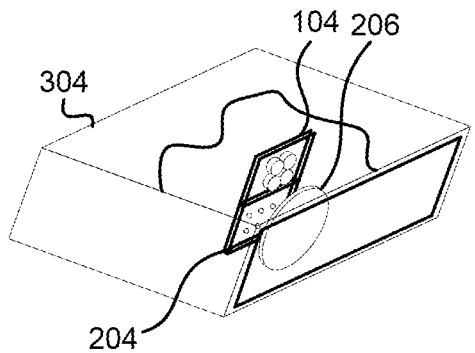

As noted, a white light illuminator 200 may be attached to an image capture device, camera, the NIR or IR illuminator, or other device in a variety of configurations, as illustrated in FIG. 3A, FIG. 3B, and FIG. 3C. In FIG. 3A, the white light LED array 204 may be connected adjacent to or in a side-by-side configuration with the NIR or IR LED array 104 (see 300). In FIG. 3B, the bottom portion or edge of the board of the white light LED array 204 may be connected, attached, or connected to the top portion or edge of the NIR or IR LED array 104 (see 302). In FIG. 3C, the top portion or edge of the board of white light LED array 204 may be connected, attached, or connected to the bottom portion or edge of the NIR or IR LED array 104 (see 304). In such embodiments, each board may include retention features, e.g., slides, friction fit features, snaps, locks, and/or latches, corresponding to other retention features of other boards, allowing each board to connect to another board. Various other configurations may exist including the white light LED array 204, the lens, the NIR or IR LED array 104, and/or some combination thereof integrated into an image capture device or camera.

Figure 4:
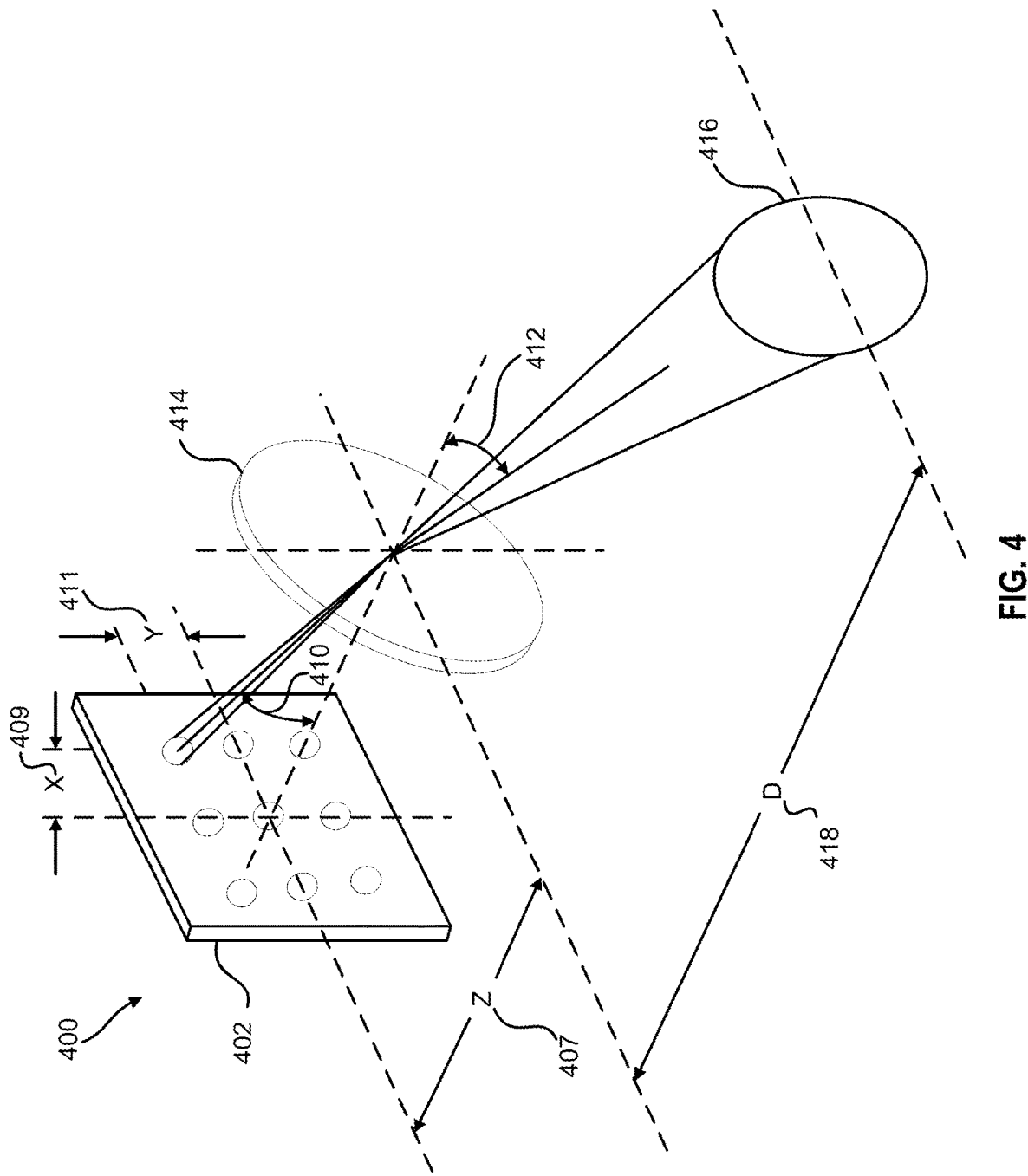
FIG. 4 is a schematic diagram of a white light LED array and lens to direct white light, according to the present disclosure.

FIG. 4 is a schematic diagram of a white light LED array and lens to direct white light, according to the present disclosure. The white light LED array 402 may include nine LEDs, less than nine LEDs, or more than nine LEDs. The white light LED array 402 may include RGB or white light LEDs. The white light LED array 402 may be powered off during the periods of time between white light pulses or strobes. Each of the LEDs of the white light LED array 402 may be positioned at distances X 409 and Y 411 in relation to a center line of the lens 414. Further, the white light LED array 402 may be set back at a predetermined distance Z 407. Such a predetermination may be calculated or determined to result in the desired focused illumination at focal distance D 418 such that the target location, zone, or coordinates 416 is illuminated. Such a focused illumination may allow for a camera or image capture device to capture a white light image of anything in the target location, zone, or coordinates 416, e.g., a vehicle's license plate, make (indicated by, for example, a decal), model (indicated by, for example, another decal), color, or other unique characteristics of the vehicle.

Angle A 410 and resultant angle B 412 may be equal. The camera or image capture device focal distance D 418, along with angle A 410 and angle B 412, may be utilized to calculate or determine where each LED, when illuminated, will shine. Such calculations or determinations may be performed for each of the LED's and/or combination of LEDs in the white light LED array 402 resulting in separate target locations, zones, or coordinates for each LED and/or combinations of LEDs. The LPR system or computing device associated with the white light illuminator 400 may store each of these target locations, zones, or coordinates. The stored target locations, zones, or coordinates may be utilized as target coordinates to be used when a location of a potential target is determined. For example, when a top right LED, as illustrated in FIG. 4, is illuminated or activated, the resulting white light may shine to the target location, zone, or coordinates 416. Lighting a different LED may result in another area or target being illuminated.

Such target locations, zones, or coordinates may be plotted on a map or area, e.g., by a computing device or the LPR system, where the LPR system may be located or deployed. In other words, the limits and range of a NIR or IR illuminator may be mapped for a road, e.g., as x and y coordinates, and, in relation to the mapped road, the target locations, zones or coordinates may be mapped as an area of the road, e.g., also as x and y coordinates. Such target locations, zones or coordinates may be referred to as known target illumination zones (see 510 in FIG. 5).

Figure 5:
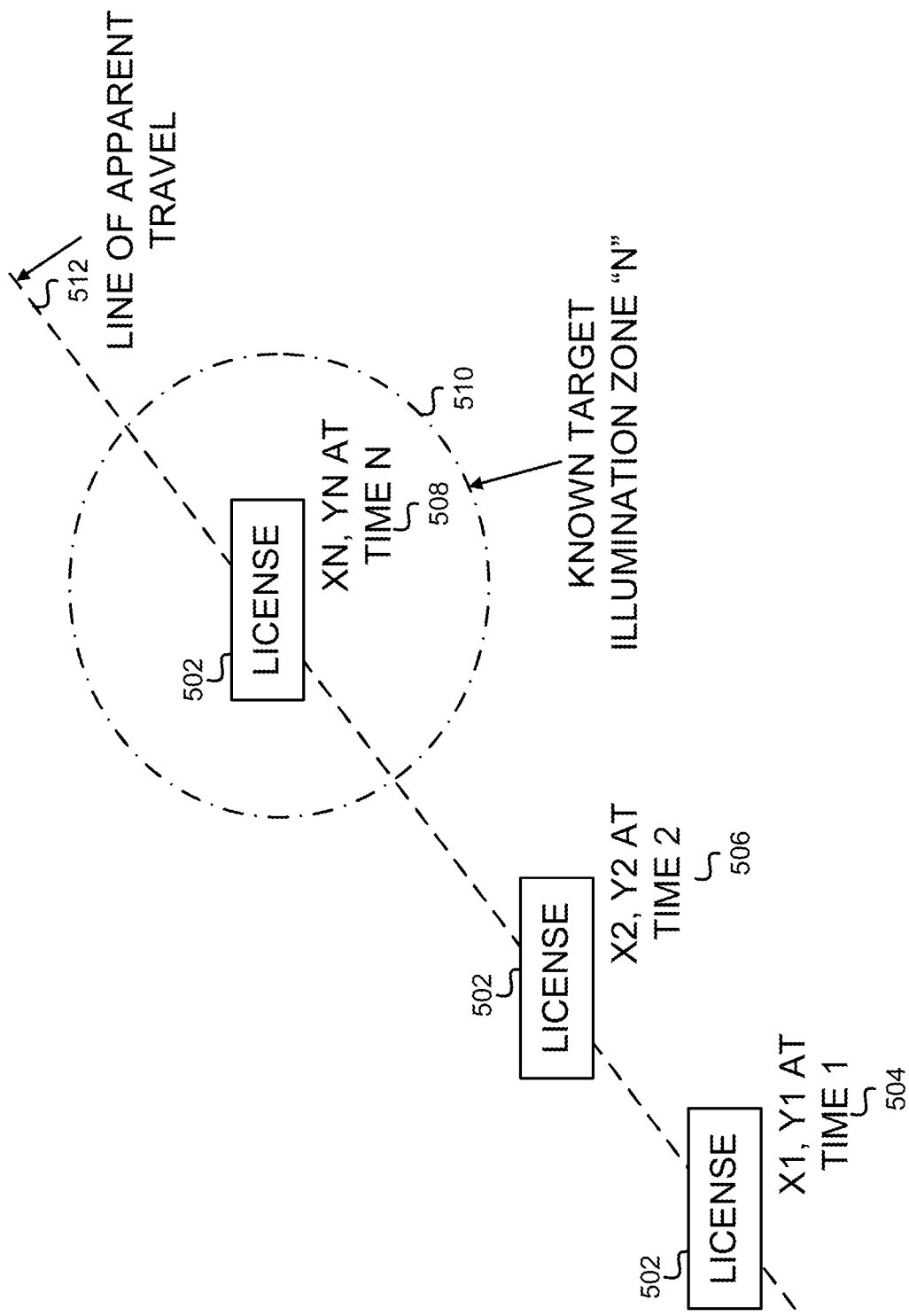
FIG. 5 is a block diagram illustrating a determination of a time of arrival for a target illumination zone, according to the present disclosure.

FIG. 5 is a block diagram illustrating a determined target illumination zone 510, according to the present disclosure. As used herein, a "computing device" may refer to an electronic device including or connected to one or more processors and non-transitory machine-readable storage medium, e.g., including, but not limited to, a controller, a desktop computer, a microcontroller connected to memory, a server, an edge server, a processor and memory of a camera or image capture device, or other devices, as will be understood by those skilled in the art. As used herein, a "non-transitory machine-readable storage medium" or "memory" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory may store or include instructions executable by the processor. As used herein, a "processor" may include, for example one processor or multiple processors included in a single device or distributed across multiple computing devices. The processor may be at least one of a central processing unit (CPU), a semiconductor-based microprocessor, a graphics processing unit (GPU), a field-programmable gate array (FPGA) to retrieve and execute instructions, a real time processor (RTP), application specific integrated circuit (ASIC), other electronic circuitry suitable for the retrieval and execution instructions stored on a machine-readable storage medium, or a combination thereof.

As a vehicle travels, a LPR system or computing device may capture images of the license plate 502 of the vehicle. Each image may include coordinates or a location of the vehicle at a specified time (see 504, 506, and 508). Using at least two coordinates or locations, e.g., first location 504 and second location 506, from two captured NIR or IR images, the LPR system may calculate or determine a slope and intercept of the vehicle, a line of apparent travel 512, or a destination path. Such a determination may be made by first calculating the rise and run of the coordinates of the vehicle. The LPR system may then determine the slope, e.g., m, for the slope-intercept form, e.g., y=mx+b, using the rise divided by the run. The LPR system may then determine the intercept of the slope-intercept form, based on any of the coordinates of the at least two images. The LPR system may then predict where the vehicle will be at a certain point in time. Other calculations, determinations, or methods may be utilized to determine or predict such a path.

As noted above, the LPR system may determine specific zones for each LED and/or combinations of LEDs of a white light LED array. Utilizing the coordinates of each specific zone and the predicted line of apparent travel 512 or destination path, the LPR system may determine which specific zone, e.g., a known target illumination zone 510, the vehicle may travel through at a future point in time, e.g., location N, as denoted at 508. Stated another way, the LPR system may determine, based on the coordinates of the multiple known illumination zones and the slope-intercept of the vehicle, line of apparent travel 512, or destination path of the vehicle, the best known target illumination zone to be utilized to capture an image of the license plate or other portion of the vehicle.

Once the known target illumination zone 510 to be utilized is determined, the LPR system may determine the distance from the last location, e.g., the second location 506, to the known target illumination zone 510. Such a distance may be calculated using, for example, $(Xn-X2)^2 + (Yn-Y2)^2$. Other calculations, determinations, or methods may be utilized to determine such a distance.

Once the known target illumination zone 510 to be utilized is determined and a distance from the last location to the known target illumination zone 510 is determined, the LPR system may determine the length of time until the vehicle reaches the known target illumination zone 510. As noted, each captured image may include a time when the image was captured, e.g., T1 for the first location 504 and T2 for the second location 506. To determine such a length of time, the LPR system may first calculate the velocity of the vehicle using the formula $\sqrt{(X2-X1)^2+(Y2-Y1)^2}/(T2-T1)$.

Using the determined distance to the known target illumination zone 510 and the velocity, the LPR system may determine an arrival time for the vehicle to arrive in the known target illumination zone 510. Such a determination may be stored in memory of the LPR system or a prediction table of the LPR system. Based on the arrival time, the LPR system may send or transmit a signal to the white light illuminator, at the time of arrival. The signal may indicate which LED, of an array of LEDs of the white light illuminator, to illuminate. The signal may further indicate how long to illuminate the LED.

Figure 6:
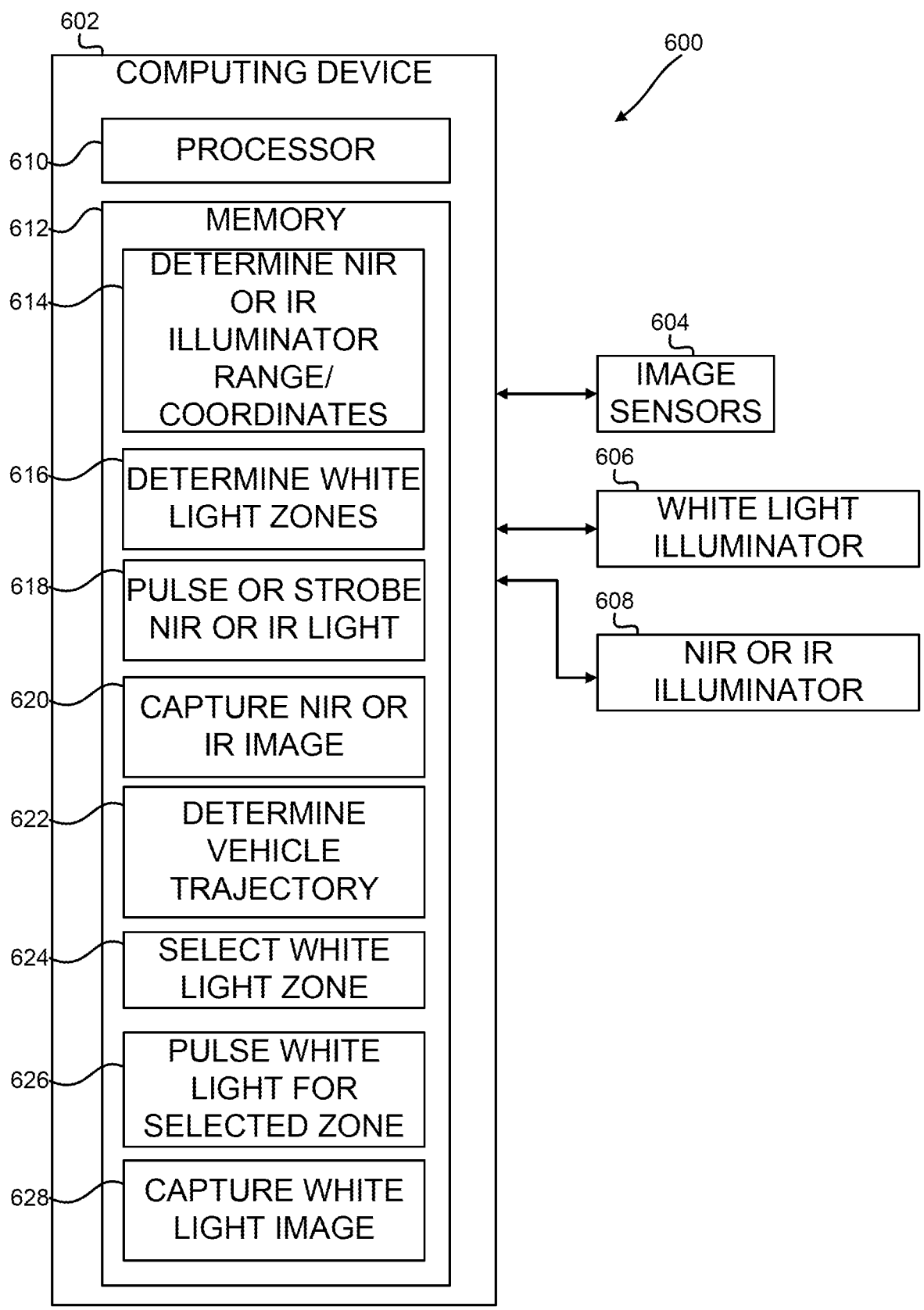
FIG. 6 is a block diagram of a LPR, according to the present disclosure.

FIG. 6 is a block diagram of a license plate reader, according to the present disclosure. The license plate reader (LPR) 600 may include one or more processors 610. The one or more processors 610 may be connected to memory 612. The computing device 602 may be connected to or in signal communication with the image sensors 604 (e.g., of a camera or image capture device), the white light illuminator 606, and the NIR or IR illuminator 608. The memory 612 may include vehicle information capture instructions. The vehicle information capture instructions may be executed by the one or more processors 610.

The memory 612 may include instructions 614 to determine the NIR or IR illuminator 608 range, coordinates, limits, or lane coverage. The instructions 614, when executed, may determine the limits of the NIR or IR illuminator 608. The instructions 614 may also determine the coordinates of such limits. Such coordinates may be utilized to determine the location of vehicles or be associated with the location of vehicles. For example, an image capture of a vehicle at a certain distance may be associated with a x and y number or coordinates. As the vehicle moves further down a destination path, x and y may increase or change in some way, based on the mapping discussed herein. Such coordinates or associations may be stored in a table. The table may be stored in memory 612.

The memory 612 may include instructions 616 to determine target illumination zones. The instructions 616 may be executed or performed for each LED and/or combination of LEDs of the white light illuminator 606. Similar to the coordinates determined for the NIR or IR illuminator 608, each zone may be associated with x and y coordinates. The coordinates for each the target illumination zone may be stored in a table. The table may be stored in memory 612. The coordinates may be determined based on the location of the LED in the white light illuminator 606, the distance of the LEDs from a lens of the white light illuminator 606, the intensity of the light from the LED, the focal point of lens, and/or some combination thereof.

In an embodiment, the memory 612 may include instructions to continuously strobe NIR or IR light from the NIR or IR illuminator 608 at a particular or specified interval. In another embodiment, the memory 612 may include instructions 618 to determine how often to strobe, pulse, or activate NIR or IR light from the NIR or IR illuminator 608. In an embodiment, the instructions 618 may vary the amount of pulses or a strobe rate based on different conditions. For example, if no vehicle is detected, the instructions 618 may pulse or strobe the NIR or IR light less frequently, e.g., every 15 seconds, 30 seconds, or 1 minute, thus capturing images at a slower rate. Once a vehicle is detected, the NIR or IR light may be pulsed more frequently or the strobe rate increased, e.g., one or more pulses per second, thus increasing the amount of images captured. As the instructions 618 are executed, signals may be sent or transmitted to the NIR or IR illuminator 608 indicating illumination of the NIR or IR lights or LEDs within the NIR or IR illuminator 608. In another embodiment, the NIR or IR illuminator 608 may be constantly or continuously illuminated.

The memory 612 may include instructions 620 to capture a NIR or IR image. The instructions 620 may be executed in conjunction with instructions 618. In other words, as NIR or IR lights or LEDs are illuminated, a signal may be sent or transmitted to the image sensors 604 to capture a NIR or IR image. If the NIR or IR light is continuously illuminated, the instructions 620 may indicate when to actually capture an image.

The memory 612 may include instructions 622 to determine a vehicle's trajectory. A vehicle's trajectory may include the path or line of apparent travel, as well as a velocity of the vehicle. The instructions 622 may first determine whether more than one image of the vehicle is captured. If more than one image is captured, the instructions 622 may continue on with the determination, otherwise the instructions 622 may request further images. The instructions 622 may determine the coordinates of each image and, using the coordinates, may determine the path or line of apparent travel. The instructions 622 may determine which of the target illumination zones are along the path or line of apparent travel. The instructions 622 may select or indicate a selection of the target illumination zone along the path or line of apparent travel, thereby defining a selected target illumination zone or white light target zone. The instructions 622 may then determine the velocity of the vehicle based on the time associate with each image, e.g., a time stamp or other indicator indicating time. Based on the velocity and remaining distance to the selected target illumination zone, the instructions 622 may determine a time remaining or a time to pulse white light and capture a white light image. Such determinations may be stored in a table in memory 612. The table may be a prediction table, while actual images and other data may be stored in a tag table.

The memory 612 may include instructions 624 to select a target illumination zone. In an embodiment, instructions 624 may be included in instructions 622. In another embodiment, instructions 624 may select a target illumination zone based on the determinations or calculations performed in instructions 622. In yet another embodiment, instructions 624 may transmit a signal to the white light illuminator 606 indicating which LED is to be illuminated for an upcoming image capture.

The memory 612 may include instructions 626 to pulse a white light for the selected target illumination zone. The instructions 626 may be executed upon reaching the end of the time remaining or reaching the time to pulse. A clock or counter may indicate when such a time is met or reached. Upon reaching the time remaining or meeting the time to pulse, the instructions 626 may send or transmit a signal to the white light illuminator 606 to pulse white light for the selected target illumination zone. The memory 612 may include instructions 628 to capture the white light image. Such instructions 628 may be executed in conjunction with instructions 626.

The computing device may include further instructions to determine a license plate number, state or country of origin of the license plate, vehicle make, vehicle model, vehicle color, and/or other characteristics of the vehicle based on the captured white light image. Such information or data may be stored in the memory 612 of the computing device or sent or transmitted to external storage, a database, and/or another computing device. Further, such information may be displayed to or on a user interface, along with other information from memory 612, external storage, and/or a database. Other information may include a vehicle history, notifications associated with the vehicle, vehicle records, warnings or alerts associated with the vehicle, and/or warnings or alerts associated with a vehicle of similar description.

Figure 7A:
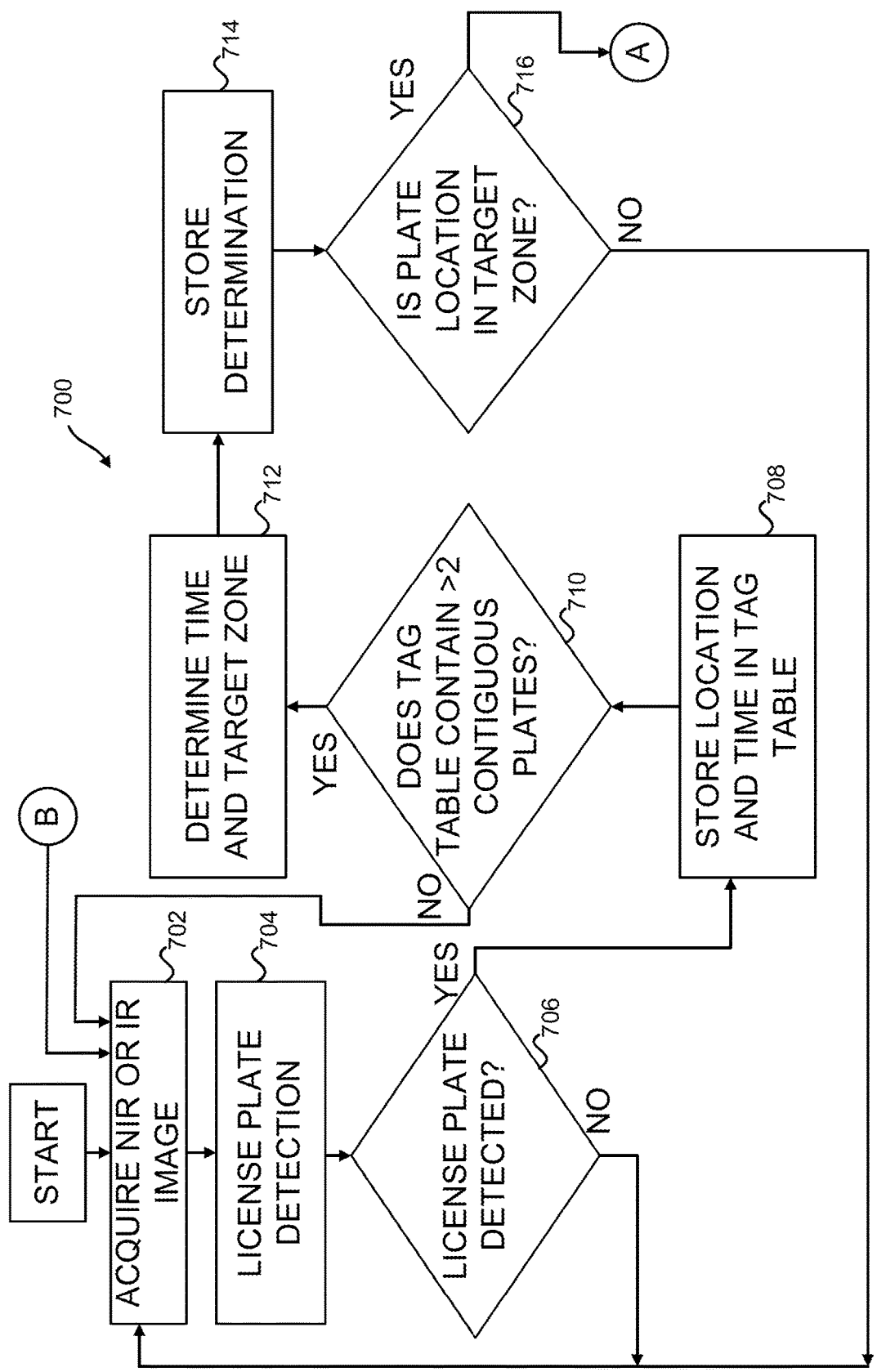
FIG. 7A and FIG. 7B are flow diagrams of processes as performed by a license plate reading (LPR) system, according to the present disclosure.
Figure 7B:
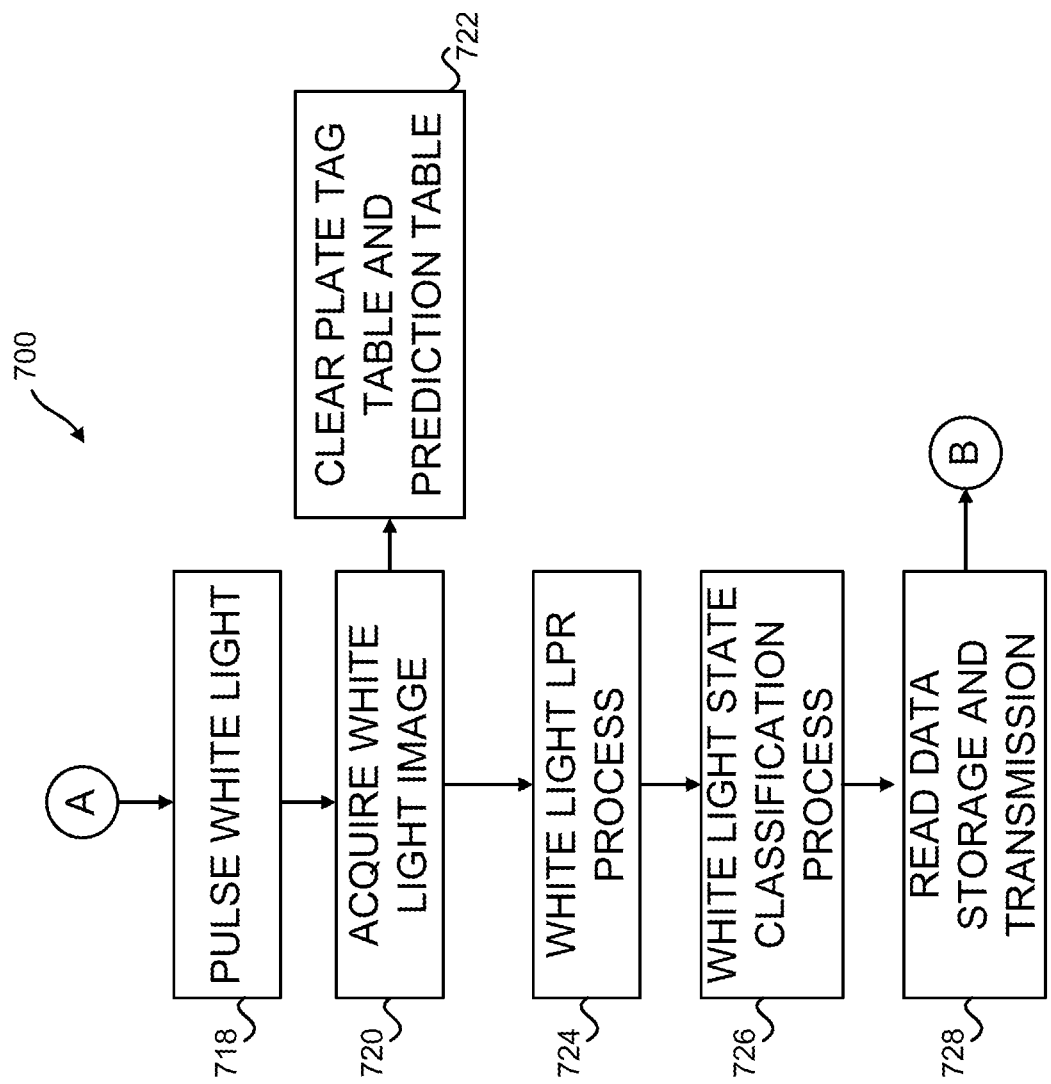

FIGS. 7A and 7B are flow diagrams, implemented in a computing device, of processes as performed by a license plate reader (LPR) system, according to the present disclosure. While method 700 is detailed with reference to the LPR 600 of FIG. 6, other components of FIGS. 1 through 4 may be utilized in such a method. Unless otherwise specified, the actions of method 700 may be completed within the LPR 600. Specifically, method 700 may be included in one or more programs, protocols, or instructions loaded into memory 612 of a computing device 602 of the LPR 600. The order in which the operations are described is not intended to be construed as a limitation, and any number of the described blocks may be combined in any order and/or in parallel to implement the methods.

At block 702, the computing device 602 may acquire one or more NIR images or IR images. The computing device 602 may utilize the image sensors 604 or a camera to obtain such images. Further, during image capture by either the image sensors 604 or camera, the computing device 602 may send or transmit a signal to the NIR or IR illuminator 608 to pulse or strobe at the time an image capture is desired.

At block 704, once the computing device 602 has obtained, acquired, or received an NIR image or IR image, the computing device 602 may determine or detect a license plate in the image. Such a detection may be determined by instructions stored in the memory 612 of the computing device 602. Such instructions may include a machine learning model or other image recognition program capable of determining whether an image has a license plate.

At block 706, the computing device 602 may determine whether a license plate has been detected. If no license plate has been detected, then the computing device 602 may attempt to obtain more NIR images or IR images or may check or determine whether an entity, vehicle, or license plate is included in a prediction or tag table. If a license plate is detected, at block 708, the computing device 602 may store the location of the license plate and the time the NIR image or IR image is captured in a tag table. A tag table may be a list or table of different values stored in a memory, e.g., memory 612 or a database connected to the computing device 602.

In some embodiments, the computing device 602 further may determine whether an entity, vehicle, or license plate from an NIR or IR image is included in a prediction or tag table. For example, the computing device can check to see if a detected license plate is present in a prediction or tag table, e.g. as indicated at 710. If a license plate is not detected, the computing device can determine if an entity, vehicle, or other identifier captured by the NIR or IR image is included in a prediction or tag table, from which a correlation between such image and a vehicle potentially can be made; and If the entity, vehicle, or license plate is in the prediction table, the computing device 602 may determine whether the license plate is in the target illumination zone. If not, the entity, vehicle, or other identifier captured by the NIR or IR image is not included in the prediction or tag table, the computing device 602 may attempt to acquire additional NIR or IR images.

At block 710, the computing device 602 may determine whether the tag table contains more than two contiguous license plates. In other words, the computing device 602 may determine whether the tag table includes at least two images of the same license plate or vehicle.

At block 712, if the tag table includes two or more contiguous license plates, the computing device 602 may determine a target illumination zone and when the license plate may be in the target illumination zone. Such a determination may be performed via a slope intercept form calculation and a calculation of vehicle velocity, based on the location of the vehicle at a time when the images are captured. As such, the computing device 602 may determine when to capture a white light image utilizing the white light illuminator 606. At block 714, the computing device may store such determinations, e.g., the target illumination zone and when the license plate may be in the target illumination zone.

At block 716, the computing device 602 may check or determine whether the license plate is in the target illumination zone at the determined time. If the license plate is not in the target illumination zone, the computing device 602 may acquire, obtain, or receive further NIR images or IR images. In another example, the computing device may utilize the time of arrival of the vehicle in the target illumination zone. Once the time of arrival is reached, the computing device 602 may capture the white light image.

At block 718, the computing device 602 may send or transmit a signal to the white light illuminator 606 indicating that the white light illuminator should pulse one or more particular LEDs of an LED array. At block 720, the computing device 602 may acquire, obtain, or receive the white light image. Once the white light image is determined, the NIR images, IR images, and/or other data relevant to the license plate other than the actual white light image, at block 722, may be cleared from the tag table and prediction table.

At block 724, the computing device 602 may perform the white light LPR process. Such a process may perform image recognition to determine a license plate. The license plate may be compared to relevant databases to determine whether the license plate is associated with criminal activity. Such determinations may include instructions to re-create the numbers or letters of a license plate automatically. The white light LPR process may include other steps.

At block 726, the computing device 602 may determine the state or a country that a license plate is from or associated with. The computing device 602 may determine the state based on instructions similar to that used in block 724. Thereafter, once the state, country, license plate number, the make of the vehicle, the model of the vehicle, the color of the vehicle, and/or some combination thereof is determined, the computing device 602 may clear any remaining data from the tag table and prediction data. At block 728, the computing device 602 may store or transfer the determined data, e.g., in memory 612, external storage, or an external database.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

The invention claimed is:

1. A computer implemented method for capturing vehicle information wherein at least one computing device performs a series of functions comprising:
 capturing a plurality of near-infrared (NIR) or infrared (IR) images of a license plate of a vehicle;
 providing the captured NIR or IR images to the at least one computing device;
 determining a projected trajectory of the vehicle based on the captured NIR or IR images;
 determining, based on the projected trajectory of the vehicle, a target illumination zone for capture of an image of the license plate or other portion of the vehicle, and through which the vehicle is projected to travel at a future point in time;
 once the target illumination zone has been determined, determining an estimated arrival time interval when the vehicle is projected to be within the target illumination zone;
 once the estimated arrival time interval when the vehicle is projected to be within the target illumination zone has been met, directing, via activation of selected LEDs of an array of LEDs positioned behind a lens, a pulse of white light toward the target illumination zone for a time and at an intensity and distance sufficient to capture a white light image of the license plate within the target illumination zone;
 capturing a white light image of at least a portion of the vehicle illuminated by the pulse of white light with an image capture device; and
 determining a license plate number and at least one additional feature of the vehicle based on the white light image.

2. The computer implemented method of claim 1, further comprising:
 determining if two or more captured NIR or IR images contain contiguous images of the license plate of the vehicle; and
 if the two or more captured NIR or IR images do not contain contiguous images of the license plate of the vehicle, capturing one or more additional NIR or IR images of the license plate of the vehicle.

3. The computer implemented method of claim 1, further comprising:
 prior to directing the pulse of the white light toward the target illumination zone, determining whether the vehicle is in the target illumination zone; and
 wherein the pulse of white light is initiated based on the determination that the vehicle is in the target illumination zone.

4. The computer implemented method of claim 1, wherein the image capture device comprises one or more near-infrared image sensors and one or more red, green, blue (RGB) image sensors.

5. The computer implemented method of claim 1, wherein the target illumination zone is defined by a portion of at least one lane of a road.

6. The computer implemented method of claim 5, wherein a plurality of target illumination zones are determined for different portions of the road based on the captured NIR or IR images.

7. The computer implemented method of claim 5, wherein a determination of the portion of the at least one lane of the road is based on a location of the vehicle at a first time and a location of the vehicle at a second time, and further comprising determining the projected trajectory of the vehicle based on a slope and intercept, determined based on the location of the vehicle at the first time and the location of the vehicle at the second time.

8. The computer implemented method of claim 1, wherein the pulse of the white light is directed toward the target illumination zone for of a sufficient time interval and the pulse of white light is of a sufficient intensity to allow the image capture device to capture the white light image.

9. The computer implemented method of claim 1, wherein a time interval, intensity, focus, targeting, or combinations thereof of the pulse of white light are such that a driver of the vehicle will not see the pulse of white light.

10. The computer implemented method of claim 1, wherein the at least one additional feature of the vehicle includes a state or country of origin for the license plate a make, model, color of the vehicle, identifying attributes, or a combination thereof.

11. A system for capture and reading of vehicle license plates comprising:
 a housing including:
  an NIR or IR emitter;
  an array of RGB or white LEDs;
  a lens disposed in front of the array of RGB or white LEDs, the lens configured to focus white light produced by the array of RGB or white LEDs at a vehicle so as to strike the vehicle at a location to avoid distraction of a driver of the vehicle;
 a camera configured to capture NIR or IR images and white light images, the NIR or IR images and the white light images including images of at least a license plate of the vehicle; and
 a computing device including:
  memory for storing captured NIR or IR images, white light images, and vehicle information capture instructions; and
  one or more processors configured to execute the vehicle information capture instructions from memory to:
   initiate continuous or periodic pulses from the NIR or IR emitter;
   receive captured NIR or IR images from the camera,
   determine if two or more contiguous NIR or IR images of the license plate are captured;
   in response to a determination that two or more contiguous NIR or IR images of the license plate are captured:
    determine a projected trajectory of the vehicle based on the captured NIR or IR images;
    determine, based on the projected trajectory, a target illumination zone though which the vehicle is predicted to pass at a future point in time, and
    once a distance to the target illumination zone has been determined based on the projected trajectory and the target illumination zone, determining an estimated time that the license plate is projected to be in the target illumination zone;

in response to a determination that the estimated time that the license plate will be in the target illumination zone has been met, activate one or more LEDs of the array of RGB or white LEDs to produce a targeted pulse of white light directed, via the lens and selection of the one or more LEDs, toward the target illumination zone;

wherein the targeted pulse of white light is directed at the target illumination zone for a time and at an intensity and distance sufficient to capture a white light image of the license plate within the target illumination zone;

capture the white light images illuminated by the targeted pulse of white light; and determine a license plate number and at least one additional identifying feature of one or more of the license plate or the vehicle.

12. The system of claim 11, wherein the at least one additional identifying feature of one or more of the license plate or the vehicle includes a state or country of origin of the vehicle, vehicle make, vehicle model, a vehicle's color, or other identifying feature, or a combination thereof.

13. The system of claim 11, wherein the NIR or IR emitter and the array of RGB or white LEDs are disposed side-by-side.

14. The system of claim 11, wherein the computing device determines where to direct the targeted pulse of white light from the array of RGB or white LEDs emitter toward the target illumination zone based on previously captured NIR or IR images of license plates.

15. The system of claim 11, wherein captured white light images are removed from memory after determining a license plate number and at least one additional identifying attribute of one or more of the license plate or the vehicle.

16. A license plate reading system comprising:
an array of NIR or IR LEDs;
an array of RGB or white LEDs,
a lens disposed in front of the array of RGB or white LEDs to focus a pulse of white light produced by one or more LEDs of the array of RGB or white LEDs;
a camera including image sensors configured to capture NIR or IR images of a license plate of a vehicle, and capture white light images of the license plate of a vehicle passing through a target illumination zone,
wherein the NIR or IR images are captured following illumination of the license plate by the array of NIR or IR LEDs during a substantially continuous interval of time,
wherein the target illumination zone is a zone through which the vehicle, traveling along on a projected trajectory, will pass at a future point in time,
wherein the white light images are captured following targeted illumination of the license plate by a pulse of white light generated by the one or more LEDs and the lens at an intensity and for a time sufficient to capture a white light image of the license plate within an illumination zone; and
wherein activation of the pulse of white light is initiated based on an estimated arrival time for the vehicle to arrive at the target illumination zone having been met.

17. The license plate reading system of claim 16, further comprising memory to store captured NIR or IR images and white light images.

18. The license plate reading system of claim 16, wherein captured white light images are removed from memory after determining a license plate number and state or country of origin of the license plate.

19. The license plate reading system of claim 16, wherein the NIR or IR images and white light images further comprise a state or country of origin, vehicle make, vehicle model, vehicle color, or combination thereof.

20. A computer implemented method for capturing vehicle information wherein at least one computing device performs a series of functions comprising:
capturing a plurality of near-infrared (NIR) or infrared (IR) images of a license plate of a vehicle via NIR or IR sensors;
providing the captured NIR or IR images to the at least one computing device;
determining, in real-time, a projected trajectory of the vehicle;
determining, based upon the projected trajectory, a target illumination zone through which the license plate of the vehicle is projected to travel at some future point in time and an estimated arrival time when the vehicle is projected to be within the target illumination zone;
upon expiration of the estimated arrival time, directing, via activation of one or more LEDs of an array of LEDs positioned behind a lens and within a housing with the NIR or IR sensors, a pulse of white light toward the target illumination zone at an intensity and for a time sufficient to capture a white light image of the license plate within the target illumination zone;
capturing a white light image of at least a portion of the vehicle illuminated by the pulse of white light with an image capture device; and
determining a license plate number and at least one additional feature of the vehicle based on the white light image.

* * * * *